United States Patent

Wright

[11] Patent Number: 6,047,935
[45] Date of Patent: Apr. 11, 2000

[54] COOLER SUPPORT

[75] Inventor: Peter Sydney Wright, Blackwood, Australia

[73] Assignee: F. F. Seeley Nominees Pty Ltd., South Australia, Australia

[21] Appl. No.: 08/861,420

[22] Filed: May 21, 1997

[30] Foreign Application Priority Data

May 21, 1996 [AU] Australia ................... PN9956

[51] Int. Cl.[7] ................................ A47G 29/02
[52] U.S. Cl. .................. 248/237; 248/188.2; 248/188.5
[58] Field of Search ................... 248/685, 688, 248/188.2, 188.5, 188.9, 405, 351, 446, 649, 346.11, 352, 650, 237, 675, 676, 188.4, 188; 62/259.4, 259.1, DIG. 16, 297

[56] References Cited

U.S. PATENT DOCUMENTS

| D. 298,276 | 10/1988 | Butcher ................................. D23/354 |
| 3,603,547 | 9/1971 | Hills ..................................... 248/188.2 |
| 4,369,148 | 1/1983 | Hawkins ........................... 62/DIG. 16 |
| 4,819,448 | 4/1989 | Campbell et al. ................ 62/DIG. 16 |
| 5,150,557 | 9/1992 | Gregory ..................................... 248/68 |
| 5,297,771 | 3/1994 | Gilbert ..................................... 248/688 |
| 5,348,258 | 9/1994 | Rasmussen ............................. 248/688 |
| 5,709,362 | 1/1998 | Clarke et al. .......................... 248/688 |

FOREIGN PATENT DOCUMENTS 593056 2/1987 Australia .

*Primary Examiner*—Ramon O. Ramirez
*Assistant Examiner*—Tan Le
*Attorney, Agent, or Firm*—Watts, Hoffmann, Fisher & Heinke Co.

[57] ABSTRACT

A roof top cooler (10) is provided with perforate side walls (11), a top panel or lid (12), and a bottom panel which comprises a sump (13), and the sump (13) has four upstanding bosses (15) adjacent the four corners of the cooler (10). Hollow spacer posts (18) are carried by the bosses (15) and extend to the top panel (12), and telescopic legs (22) which are also of circular cross-sectional shape and form the inner component of a leg and post assembly, the telescopic legs (22) being slidably adjustable within the spacer posts (18) and retractable for packaging purposes, and the telescopic legs (22) terminating in their lower ends in respective feet (23) which are affixed to their lower ends by means of swivel means (24, 25).

20 Claims, 1 Drawing Sheet

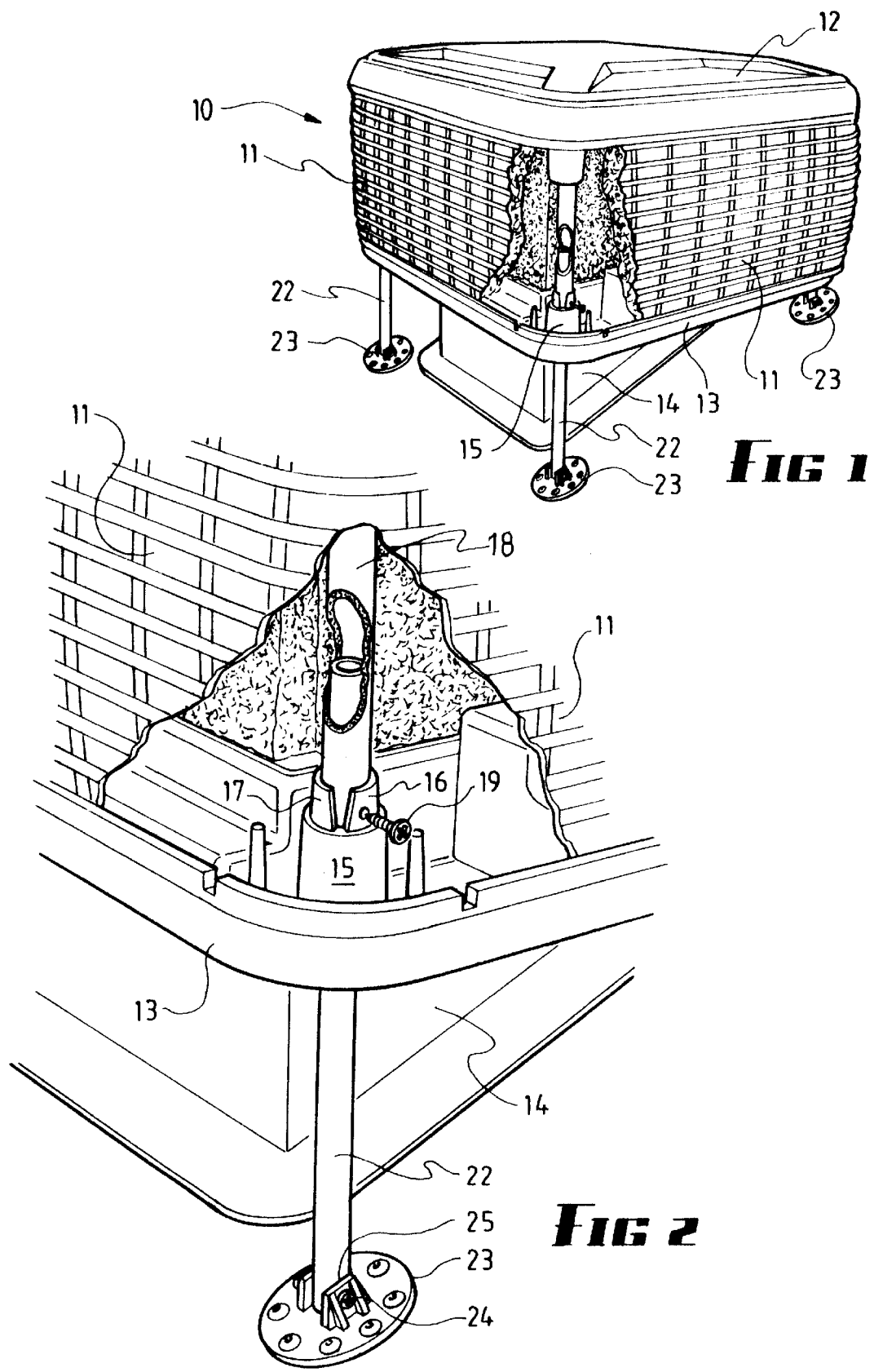

COOLER SUPPORT

This invention relates to support means for supporting a so-called "roof top" cooler. It also relates to a method of installation.

BACKGROUND OF THE INVENTION

Roof top coolers of the evaporative type are popular because of their low running costs and high output and efficiency in dry climates, and traditionally a roof top cooler is connected to large distribution conduits or ducts by means of a vertical trunk which is of size and shape to convey cooled air, and has a lower flange contiguous with the top of a roof, and an upper portion which supports the cooler.

Roofs, of course, vary considerably in structure and in slope, and therefore it is necessary for the trunk to be "tailored" to a specific roof requirement. As a consequence of that, it is usual for trunks to be formed from metal, and metal on a roof is liable to deterioration due to corrosion. If corrosion occurs, it is possible under extreme conditions for a cooler to lose its support on a roof and as a consequence of this in certain areas of the world, there are requirements to have legs which can engage the upper surface of a roof and which will support the cooler in a case of deterioration of the trunk.

However, the addition of legs can be quite costly both in manufacture and in installation, partly due to the variation of slope which is encountered in installation. Furthermore, legs need to be separately packed and some are likely to be of dimension which exceeds the width or length of a cooler, and this in turn requires separate packaging, which can cause delays in installation.

A cooler has a considerable weight, and it is believed that some of the proposals which have been made in prior art have been inadequate to support that weight under extreme conditions of weather and wind.

PRIOR ART

Very little prior art is known to the Applicant. Reference may be made to Applicant's Australian Patent No 593056 and U.S. Registered Design No 298276, but neither of these, nor any other prior art known to the Applicant, discloses support legs which telescopically engage hollow spacer posts, adjustably for position to accommodate different roof slopes.

Objects of this invention include provision of means whereby additional packaging of the legs is not required when a cooler is delivered from factory, wherein the legs can accommodate differing slopes of roofs, and wherein the legs provide a high degree of security against collapse.

BRIEF SUMMARY OF THE INVENTION

In an embodiment of this invention, a roof top cooler is provided with perforate side walls, a top panel or lid, and a bottom panel which comprises a sump, and the sump has four upstanding bosses adjacent the four corners of the cooler, hollow spacer posts carried by the bosses and extending to the top panel, and telescopic legs which are also of circular cross-sectional shape and form the inner component of a leg and post assembly, the telescopic legs being slidably adjustable within the spacer posts and retractable for packaging purposes, and the telescopic legs terminating in their lower ends in respective feet which are affixed to their lower ends by means of swivel means.

With this invention therefore, the legs can be retained by a simple securing means, for example self-piercing screws each extending through portion of the upstanding boss to clamp the spacer posts and legs in place during transport, and upon the screw being relaxed, allow the legs to be lowered until the feet come into surface to surface contact with the roof, and to be secured in that position by the aforesaid self tapping screw, or by further self tapping screws, or both.

BRIEF DESCRIPTION OF THE DRAWINGS

An embodiment of the invention is described hereunder with reference to and is illustrated in the accompanying drawings in which:

FIG. 1 shows a typical installation of an evaporative cooler on the roof of a dwelling, with one corner "broken away" to illustrate the manner in which the legs support the cooler; and FIG. 2 is a view of the "break away" corner drawn to a larger scale to illustrate features of the invention.

In this embodiment, a cooler 10 comprises four side walls 11 which are perforate (and thereby not necessarily suitable for very high loadings), a top panel or lid 12 and a sump 13. A trunk 14 interconnects the cooler with a ducting network which is not herein disclosed, and in prior art installations sometimes that trunk 14 was required to support the entire weight of the cooler. However, in this embodiment, the sump 13 is provided at each corner with a respective upstanding boss 15 which carries on it a clamping extension 16. The clamping extension 16 is part circular in plan, being provided with a slot 17 which enables the clamping extension 16 to clamp the lower end of a tubular spacer post 18 within a dimensional tolerance range, Clamping of the sleeve 18 is also supplemented by means of a self-piercing securing screw 19.

Each spacer post 18 telescopically receives a respective leg 22 which is freely slidable in the spacer post 18 to provide a telescopic leg assembly, and upon manufacture the clamping screw 19 can be used to retain the leg in its fully retracted position within the spacer post 18 for transport purposes. However, upon installation, the clamping screw 19 may be partly unscrewed, the legs 22 then being lowered until feet 23 on their lower ends abut the upper surface of a roof in surface to surface contiguity, the contiguity being effected by means of a swivel pin 24 (or its equivalent) extending between two upstanding lugs 25 on the upper surface of each of the feet 23.

Once the feet 23 are in firm engagement with the roof surface, the clamping screw 19 can again be tightened and being of the self-piercing type, can penetrate the wall of the spacer post 18 and the upper end of leg 22, the screw 19 passing through the clamping extension 16. Additional screws may be used if required. The effectiveness of the legs 22 is so good that the trunk 14 which is normally an expensive accessory of the cooler 10 can be produced from much less robust material, and if certain selected plastics are used, the requirement for painting can be avoided, and the trunk 14 can be of lower cost than heretofore. Since the trunk 14 would then be more easily adjusted for height and slope, it can be more readily fitted than the metal trunks presently used.

From the above description, it will be clear that the invention extends to a method of installation.

The feet 23 which are illustrated in the drawings are shown to have planar lower surfaces, but obviously they can be of corrugated or other form to suit roofs which are of different surface shape.

What is claimed is:

1. In a roof top evaporative cooler including perforate side walls, a top panel, and a bottom panel including a sump, the improvement comprising:

a cooler support including:

a) four hollow bosses within the side walls and upstanding from said sump, four hollow spacer posts also within the side walls, at least partially above the sump and having their lower ends supported by respective said bosses and their upper ends fast with said top panel, b) at least two circular, rigid support legs telescopically engaging and depending from respective said spacer posts each for supporting at least a portion of the weight of said cooler when in a use position;

c) and securing means securing said support legs within said posts in an adjusted position when the cooler is in use.

2. A cooler according to claim 1 wherein said securing means comprise respective self-tapping screws, each extending through a respective said boss, a wall of a said hollow spacer post and at least penetrating a said leg.

3. A cooler according to claim 2 wherein each said boss has a clamping portion, and its said screw extends through said clamping portion.

4. A cooler according to claim 1 further comprising feet at the lower ends of respective said legs, each foot having a pair of spaced upstanding lugs, and a swivel pin extending through said lugs and a lower end of a said leg in a configuration wherein each said foot can swivel with respect to its said leg.

5. A cooler according to claim 1 wherein there are four said cooler support posts and four said legs secured to respective posts, near four corners of said cooler.

6. The cooler of claim 1, wherein the legs have storage positions substantially within respective said spacer posts whereby to facilitate storage and shipment of the cooler.

7. In a roof top evaporative cooler having a sump and upstanding side walls, the improvement comprising:

a system for supporting the cooler atop a sloping roof comprising:

a) at least two spacer posts positioned in spaced relationship with one another, each post extending at least partially above the sump and being within the side walls;

b) each of the posts defining a support leg receiving space having a lower access opening;

c) at least two support legs each at least partially telescopically disposed within the space of an associated one of the posts, each of the legs having a roof engaging end port on;

d) the legs and posts being relatively adjustable telescopically whereby when in use the end portions are placed in engagement with a roof and the sump is supported generally horizontal; and, e) securing means for fixing each leg and its associated post in an adjusted position.

8. The system of claim 7, wherein there are four spacer posts each positioned near a different one of four corners of the cooler and there are four support legs, each at least partially telescoped into a different one of the posts.

9. The system of claim 7, wherein the securing means are self tapping screws at least some of which are each threaded through an associated post and engage its associated leg.

10. The system of claim 7, further including a trunk for connecting a cooler to a ducting system of a building having the sloping roof.

11. The system of claim 7, wherein each of said legs is rotatable in its associated post.

12. The system of claim 11, wherein there are a plurality of pivotal feet and each foot is pivotally connected to an associated one of the legs near a base of the associated leg.

13. The system of claim 7, wherein there are a plurality of pivotal feet and each foot is pivotally connected to an associated one of the legs near a base of the associated leg.

14. The system of claim 7, wherein the legs have storage positions substantially within respective said spacer posts whereby to facilitate storage and shipment of the cooler.

15. A roof top evaporative cooler comprising:

a) a sump and upstanding side walls, and b) an improved support system for supporting the cooler atop a sloping roof, the system including:

i) at least two spacer posts positioned in spaced relationship with one another, each post extending at least partially above and connected to the sump, the posts being within the side walls;

ii) each of the posts defining a support leg receiving space having a lower access opening;

iii) a plurality of support legs each at least partially telescopically disposed within the space of an associated one of the posts, each of the legs having a roof engaging end portion;

iv) the legs and posts being relatively adjustable telescopically whereby when in use the end portions are placed in engagement with a roof and the sump is supported generally horizontal; and, v) securing means for fixing each leg and its associated post in an adjusted position.

16. The cooler of claim 15, wherein there are four spacer posts each positioned near a different one of four corners of the cooler and there are four support legs, each at least partially telescoped into a different one of the posts.

17. The cooler of claim 15, wherein each of said legs is rotatable in its associated post.

18. The cooler of claim 17, wherein there are a plurality of pivotal feet and each foot is pivotally connected to an associated one of the legs near a base of the associated leg.

19. The cooler of claim 15, wherein there are a plurality of pivotal feet and each foot is pivotally connected to an associated one of the legs near a base of the associated leg.

20. The cooler of claim 15, wherein the legs have storage positions substantially within respective said spacer posts whereby to facilitate storage and shipment of the cooler.

* * * * *